United States Patent
Gekht et al.

(10) Patent No.: US 7,124,857 B2
(45) Date of Patent: Oct. 24, 2006

(54) ROTATING SHAFT SCAVENGING SCOOP

(75) Inventors: Eugene Gekht, Brossard (CA);
Thomas Francis Haslam-Jones,
Brossard (CA); Pierre-Yves Légaré,
Chambly (CA)

(73) Assignee: Pratt & Whitney Canada Corp.,
Longueuil (CA)

( * ) Notice: Subject to any disclaimer, the term of this patent is extended or adjusted under 35 U.S.C. 154(b) by 181 days.

(21) Appl. No.: 10/802,830

(22) Filed: Mar. 18, 2004

(65) Prior Publication Data

US 2006/0213726 A1    Sep. 28, 2006

(51) Int. Cl.
*F01M 11/02* (2006.01)
(52) U.S. Cl. .................. 184/11.2; 184/13.1; 384/471
(58) Field of Classification Search ........... 184/13.1, 184/11.1, 11.4, 11.2, 26; 384/471
See application file for complete search history.

(56) References Cited

U.S. PATENT DOCUMENTS

| | | | |
|---|---|---|---|
| 2,102,973 A * | 12/1937 | Porsche | 475/160 |
| 2,848,284 A | 8/1958 | Atkinson et al. | |
| 3,429,400 A * | 2/1969 | Engle et al. | 184/11.1 |
| 4,111,500 A * | 9/1978 | Ando | 384/471 |
| 4,144,950 A | 3/1979 | Moyer et al. | |
| 4,525,995 A | 7/1985 | Clark | |
| 4,605,101 A | 8/1986 | Barbeau | |
| 4,683,714 A | 8/1987 | Thebert | |
| 4,714,139 A | 12/1987 | Lorenz et al. | |
| 4,844,201 A * | 7/1989 | Ackerman | 184/6 |
| 5,107,676 A | 4/1992 | Hadaway et al. | |
| 5,489,190 A | 2/1996 | Sullivan | |
| 5,609,073 A * | 3/1997 | Spooner et al. | 74/650 |
| 5,618,335 A | 4/1997 | Pink et al. | |
| 5,749,660 A * | 5/1998 | Dusserre-Telmon et al. | 384/475 |
| 6,039,667 A * | 3/2000 | Schunck et al. | 475/159 |
| 6,991,378 B1 * | 1/2006 | Jacquemont et al. | 384/471 |
| 2004/0182647 A1 * | 9/2004 | Watanabe et al. | 184/11.4 |
| 2006/0002645 A1 * | 1/2006 | Swainson | 384/462 |

* cited by examiner

*Primary Examiner*—David Fenstermacher
(74) *Attorney, Agent, or Firm*—Ogilvy Renault LLP

(57) ABSTRACT

A bearing scavenge system comprises a scavenging passage extending axially through a rotating shaft supported by the bearing assembly. Oil and air are drawn from an oil cavity of the bearing assembly and evacuated through the rotating shaft as the shaft rotates.

21 Claims, 3 Drawing Sheets

ROTATING SHAFT SCAVENGING SCOOP

BACKGROUND OF THE INVENTION

1. Field of the Invention

The present invention generally relates to gas turbine engines and, more particularly, to oil scavenging systems.

2. Description of the Prior Art

Proper scavenging of used oil in bearing assemblies is essential to prevent overheating and premature wear of gas turbine engine mechanical parts. The used oil is usually circulated to an oil treatment system to remove air and particles therefrom before being returned to the bearing assemblies.

Oil scavenging systems typically rely on a simple pressure imbalance to direct the used oil into collection tubes for transport to a main oil pump of the oil treatment system. More efficient systems have been devised, employing special pumps or spinning vanes to improve the used oil circulation. However, such special pumps and vanes increase the weight of the engine and thus the costs of operation.

Accordingly, there is a need for an efficient scavenge system for a bearing assembly that has a minimal weight.

SUMMARY OF THE INVENTION

It is therefore an aim of the present invention to provide an improved scavenge system for a bearing assembly of a gas turbine engine.

Therefore, in accordance with a general feature of the present invention, there is provided a scavenge system for a bearing assembly, the system comprising a scavenging passage extending axially through a rotating shaft supported by the bearing assembly, and at least one scoop provided on the rotating shaft, said at least one scoop impelling oil internally of said rotating shaft into said scavenging passage as said at least one scoop rotates with said rotating shaft.

In accordance with a further general aspect of the present invention, there is provided a scavenge system for a bearing assembly, the system comprising a scavenging passage extending axially through a rotating shaft supported by the bearing assembly, and means provided on the rotating shaft for drawing oil internally of said rotating shaft into said scavenging passage as said shaft rotates.

In accordance with a further general aspect of the present invention, there is provided a gas turbine engine comprising a compressor section, a combustor and a turbine section in serial flow communication with one another, a main rotating shaft supported by a bearing assembly, and a scavenge system for the bearing assembly, the scavenge system comprising a scavenging passage extending axially through said main rotating shaft, and at least one inlet hole defined in said main rotating shaft and in flow communication with said scavenging passage, said at least one inlet hole extending at an angle to a radius of the main rotating shaft to thereby cause oil about the rotating shaft to be drawn into said scavenging passage in said main shaft via said at least one inlet hole as said main shaft rotates.

Also in accordance with another general aspect of the present invention, there is provided a scavenge system for a bearing assembly supporting a rotating shaft in a gas turbine engine, the system comprising first fluid communication means between a lubricant cavity containing the bearing assembly and an annular inner surface closely surrounding an outer surface of the rotating shaft, second fluid communication means within the rotating shaft communicating with a stationary chamber, and third fluid communication means between the outer surface of the rotating shaft and the second fluid communication means, the third fluid communication means being defined such as to communicate with the first fluid communication means during at least a portion of a rotation of the shaft, and such that the rotation of the shaft causes used lubricant coming from the lubricant cavity to be moved from the first fluid communication means to the third fluid communication means so as to deliver the used lubricant to the stationary chamber through the second fluid communication means.

In accordance with a still further general aspect of the present invention, there is provided a method of evacuating scavenge air and oil from a bearing assembly supporting a main shaft of a gas turbine engine, the method comprising the steps of: a) feeding the scavenge air and oil from the bearing assembly to an interface with said main shaft, b) drawing the scavenge air and oil from said interface into said main shaft, and c) evacuating the oil axially through said main shaft.

BRIEF DESCRIPTION OF THE DRAWINGS

Reference will now be made to the accompanying drawings, showing by way of illustration a preferred embodiment of the invention and in which.

DESCRIPTION OF THE PREFERRED EMBODIMENTS

Figure 1:
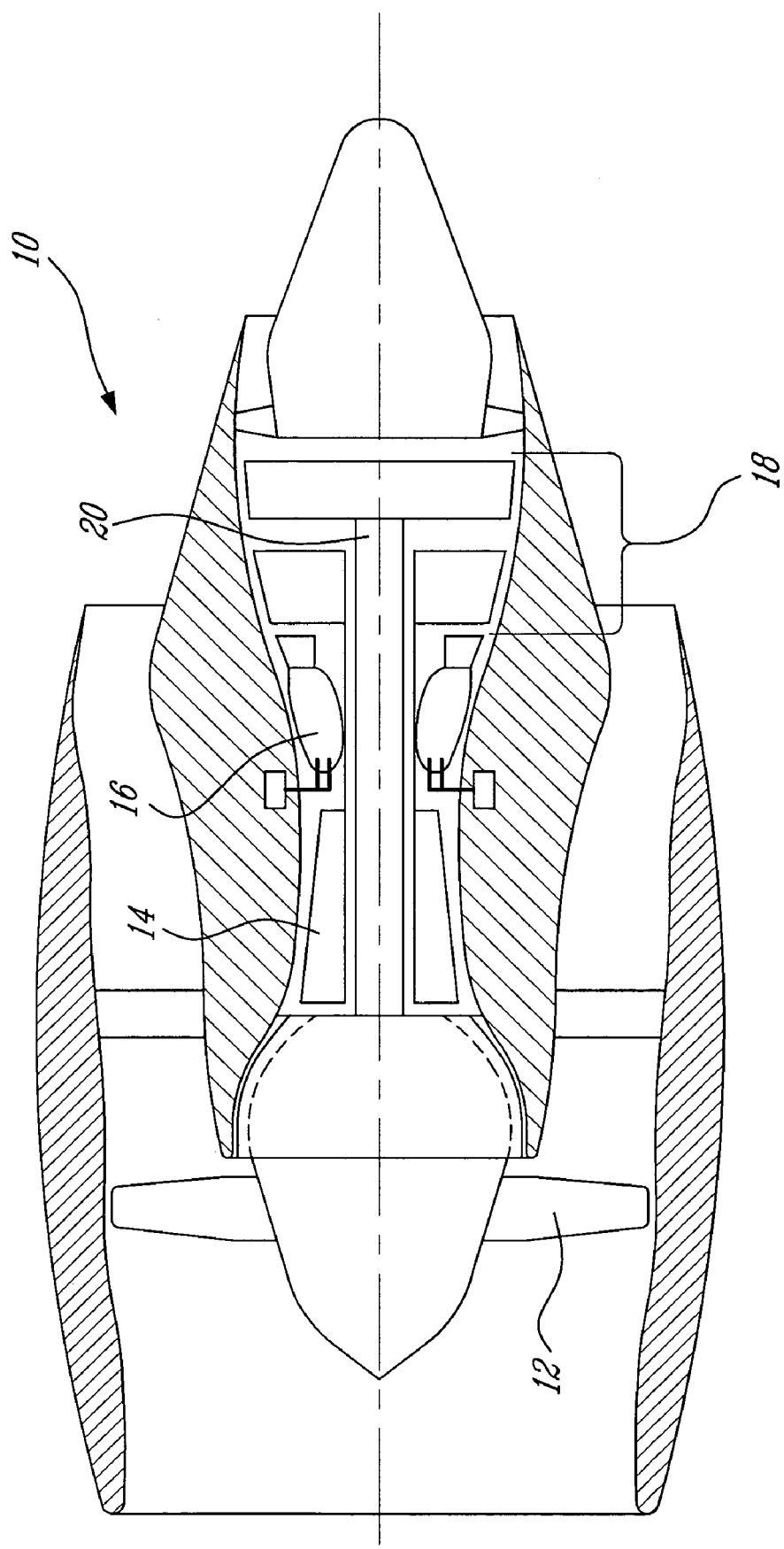
FIG. 1 is a schematic side view of a gas turbine engine, in partial cross-section, to which an embodiment of the present invention is applied.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. A rotating shaft 20 extends within the engine 10 and transfers energy from the turbine section 18 to the compressor 14 and the fan 12.

Figure 2:
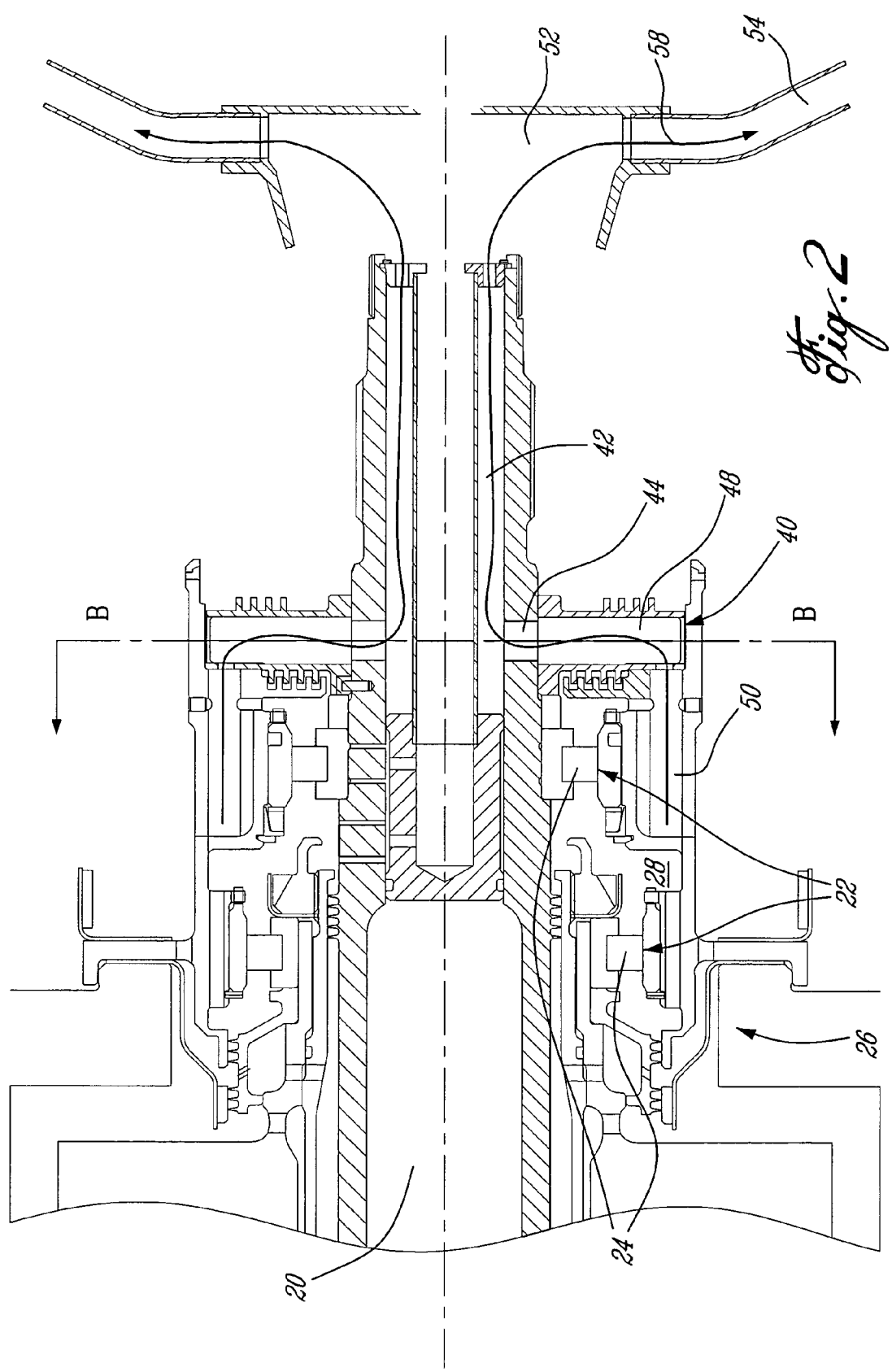
FIG. 2 is a cross-sectional side view showing bearing assemblies supporting a rotating shaft of the gas turbine engine of FIG. 1.

Referring to FIG. 2, the rotating shaft 20 is supported by a plurality of annular bearing assemblies 22, as well known in the art. Each annular bearing assembly 22 comprises a series of roller bearings 24 located in a bearing compartment 26. The bearing compartment 26 is defined such that each bearing assembly 22 is located within an annular oil cavity 28. The annular oil cavity 28 contains oil providing adequate lubrication to the bearing assembly 22.

Figure 3:
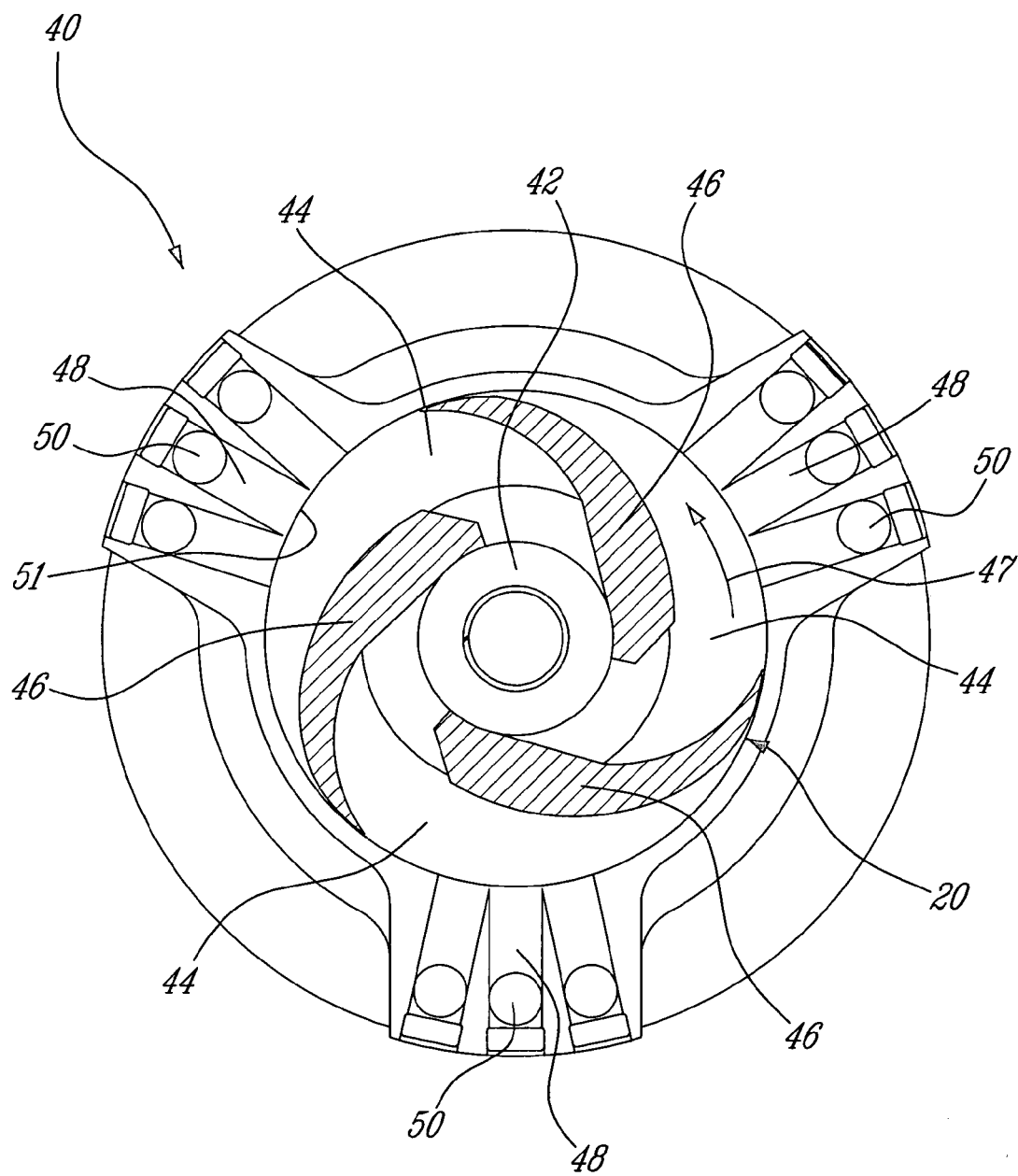
FIG. 3 is a cross-sectional view of a scavenge system taken along lines B—B of FIG. 2.

During use, used oil from the oil cavity 28 is circulated to an oil treatment system (not shown) in order to remove unwanted debris and air from the used oil. A scavenge system 40 is used to direct the mixture of air and oil from the oil cavity 28 to the oil treatment system. The scavenge system 40 is illustrated in FIGS. 2–3 and will be described in the following.

In the bearing compartment 26, a series of axial tubes 50 extend along an axial direction of the rotating shaft 20, and a series of radial tubes 48 extend along a radial direction relative to the rotating shaft 20. Each axial tube 50 has one end connected to one end of a corresponding radial tube 48. The opposed end of each axial tube 50 is in fluid communication with the oil cavity 28. The opposed end of each radial tube 48 defines an opening 51 in an inner annular surface of the bearing assembly 22 which closely surrounds the rotating shaft 20. The openings 51 are distributed along a circumference of the inner annular surface.

The combination of each axial tube 50 with the corresponding radial tube 48 forms a conduit going from the oil cavity 28 to an opening 51 at the interface between the bearing compartment 26 and the rotating shaft 20.

An annular channel 42 is defined within the rotating shaft 20 and is concentric therewith. A plurality of holes 44 are defined around a circumference of an outer surface of the rotating shaft 20. The holes 44 are in fluid communication with the annular channel 42. The holes 44 are preferably perpendicular to the annular channel 42 and defined at a large angle with respect to a radius of the rotating shaft 20. The holes 44 are machined so that the remaining shaft material between adjacent holes forms a curved scoop 46. The holes 44 are located in the same diametrical plane as the openings 51, such that each hole 44 can be aligned in turn with each opening 51 and be in fluid communication therewith during the rotation of the shaft 20.

The scoops 46 preferably have a curved section, and are progressively thinner toward the outer surface of the shaft 20. As such, they have a profile which is similar to an airfoil. The scoops 46 are curved in the direction of rotation of the shaft 20 as depicted by arrow 47 in FIG. 3. A space between adjacent scoops 46, which is curved and thinner toward the center of the shaft 20, defines the shape of the holes 44. The shape and angle of the holes 44 and scoops 46 minimizes the effects of the centrifugal forces acting to push the air and oil mixture away from the shaft 20. Thus, a rotation of the holes 44 and scoops 46 brought by the rotation of the shaft 20 will "pick up" and draw the air and oil mixture coming from the openings 51 to bring it to the annular channel 42 through the holes 44.

Because the angle of the holes 44 with respect to the radial direction of the shaft 20 is preferably large, the number of holes 44 and scoops 46 is preferably limited to three. As illustrated in FIG. 3, a preferred embodiment of the scavenge system 40 includes three groups having each three radial tubes 48 and axial tubes 50 defined in proximity to one another such as to have a common opening 51 for each group. The holes 44, scoops 46 and groups of tubes 48, 50, are all equally angularly spaced apart in order to provide a balanced scavenge system 40.

Thus, the mixture of air and oil can be transported from the oil cavity 28 to the openings 51 at the interface between the bearing compartment 26 and the rotating shaft 20, then from the openings 51 to the holes 44. The mixture then travels along the annular channel 42 to an extremity thereof which extends such as to define an annular exit port at the end of the shaft 20. This exit port provides fluid communication between the annular channel 42 and a stationary chamber 52 located at the downstream end of the shaft 20, where the mixture is collected. Pipes 54 provide fluid communication between the chamber 52 and an oil treatment system. A sufficient pressure gradient ensures that the air and oil mixture will circulate adequately from the oil cavity 28 to the oil treatment system following arrow 56. The following treatment of the air and oil mixture and subsequent return of the cleaned oil to the oil cavity 28 is well known in the art and as such will not be discussed herein.

In an alternate embodiment, it is contemplated to replace the chamber 52 located at the end of the shaft 20 by an annular stationary chamber located around the rotating shaft 20 and in fluid communication with the channel 42 through a series of radial holes. In this case, the centrifugal forces acting on the used oil propels it from the channel 42 to the annular chamber, where it can be led to the oil treatment system through appropriate piping.

The scavenge system 40 can also be used with other types of bearing assemblies supporting a rotating shaft, and as such should not be construed as being limited to aircraft engines.

The scavenge system 40 uses a channel 42 which is directly machine within the shaft, and scoops 46 are preferably formed by removing material from the rotating shaft 20 in order to machine the holes 44. Thus, these components reduce the weight of the rotating shaft rather than increase the overall engine weight, as added components would. The scavenge system 40 therefore has the advantage of representing a minimal weight increase for the engine.

It is understood that the present invention applies to any gas turbine engines, and in fact to any rotating machinery in which oil is scavenged.

The embodiments of the invention described above are intended to be exemplary. Those skilled in the art will therefore appreciate that the forgoing description is illustrative only, and that various alternatives and modifications can be devised without departing from the spirit of the present invention. Accordingly, the present is intended to embrace all such alternatives, modifications and variances which fall within the scope of the appended claims.

The invention claimed is:

1. A scavenge system for a bearing assembly, the system comprising a scavenging passage extending axially through a rotating shaft supported by the bearing assembly, at least one inlet passage extending substantially radially inwardly from a peripheral surface of the shaft to said scavenging passage, and at least one scoop provided on the rotating shaft, said at least one scoop impelling oil internally of said rotating shaft radially inwardly through said at least one inlet passage into said scavenging passage as said at least one scoop rotates with said rotating shaft.

2. A scavenge system as defined in claim 1, wherein at least two scoops are defined in said rotating shaft, and wherein each pair of adjacent scoops defines one of said at least one inlet passage therebetween.

3. A scavenge system as defined in claim 1, wherein said at least one scoop curves radially outwardly in a direction of rotation of said rotating shaft.

4. A scavenge system as defined in claim 1, wherein said at least one scoop has a curved cross-section which is thinner toward the outer surface of the rotating shaft.

5. A scavenge system as defined in claim 2, further comprising a number of conduits in fluid communication with an oil cavity communicating with the bearing assembly, the conduits defining a plurality of circumferentially aligned openings in an annular inner surface closely surrounding an outer surface of the rotating shaft.

6. A scavenge system as defined in claim 1, wherein said scavenging passage is concentric with the rotating shaft and in fluid flow communication with a stationary chamber.

7. A scavenge system as defined in claim 5, wherein there is provided at least two angularly spaced-apart inlet passages in the rotating shaft between the scoops, each of the inlet passages being defined such as to alternately be aligned with each of the plurality of openings during a rotation of the shaft, the rotation of the shaft creating an interaction between aligned inlet passages and openings such that used oil flowing from the conduits is drawn from the openings to the inlet passages, so as to flow through the scavenge passage axially of the rotating shaft.

8. A scavenge system as defined in claim 7, wherein the scavenge passage is annular.

9. A scavenge system as defined in claim 5, wherein each of the conduits is composed of a first tube connected to a second tube, the first tube extending along an axial direction of the rotating shaft and the second tube extending along a radial direction of the rotating shaft.

10. A scavenge system as defined in claim 1, wherein each inlet passage is perpendicular to the scavenge passage and is inclined with respect to a radius of the rotating shaft.

11. A scavenge system as defined in claim 5, wherein the plurality of openings are grouped in series of closely adjacent openings, the series being regularly angularly spaced apart.

12. A scavenge system as defined in claim 6, wherein the stationary chamber is located at a downstream end of the rotating shaft.

13. A scavenge system for a bearing assembly, the system comprising a scavenging passage extending axially through a rotating shaft supported by the bearing assembly, and means provided on the rotating shaft for drawing oil radially inwardly towards a central axis of said rotating shaft and into said scavenging passage as said shaft rotates.

14. A scavenge system as defined in claim 13, wherein said means comprise at least one hole defined in said rotating shaft, said at least one hole being perpendicular to an axis of the rotating shaft and at an angle to a radius thereof.

15. A scavenge system as defined in claim 13, wherein said means comprise at least one scoop provided at the outer surface of the rotating shaft, said at least one scoop picking up oil at the outer surface of the shaft and directs the oil into said scavenge passage as the shaft rotates.

16. A scavenge system as defined in claim 15, wherein said means comprise at least two scoops defined in said rotating shaft, and wherein each pair of adjacent scoops defines an inlet passage therebetween, said inlet passage being in fluid flow communication with said scavenging passage.

17. A scavenge system as defined in claim 15, wherein said at least one scoop curves radially outwardly in a direction of rotation of said rotating shaft.

18. A scavenge system as defined in claim 15, wherein said at least one scoop has a curved cross-section which is thinner toward the outer surface of the rotating shaft.

19. A scavenge system as defined in claim 13, further comprising: first fluid communication means between a lubricant cavity containing the bearing assembly and an annular inner surface closely surrounding an outer surface of the rotating shaft.

20. A scavenge system as defined in claim 19, wherein said first fluid communication means comprise a number of conduits in fluid communication with the lubricant cavity, the conduits defining a plurality of circumferentially aligned openings in said annular inner surface.

21. A scavenge system for a bearing assembly, the system comprising a scavenging passage extending axially through a rotating shaft supported by the bearing assembly, and at least one scoop provided on the rotating shaft, said at least one scoop impelling oil internally of said rotating shaft into said scavenging passage as said at least one scoop rotates with said rotating shaft, further comprising a number of conduits in fluid communication with an oil cavity communicating with the bearing assembly, the conduits defining a plurality of circumferentially aligned openings in an annular inner surface closely surrounding an outer surface of the rotating shaft, wherein there is provided at least two angularly spaced-apart inlet passages in the rotating shaft between the scoops, each of the inlet passages being defined such as to alternately be aligned with each of the plurality of openings during a rotation of the shaft, the rotation of the shaft creating an interaction between aligned inlet passages and openings such that used oil flowing from the conduits is drawn from the openings to the inlet passages, so as to flow through the scavenge passage axially of the rotating shaft.

* * * * *